Sept. 29, 1959           R. C. HERMAN           2,906,638
METHOD OF COATING SEAMLESS BRAIDED GLASS FIBER TUBES
Filed July 9, 1954
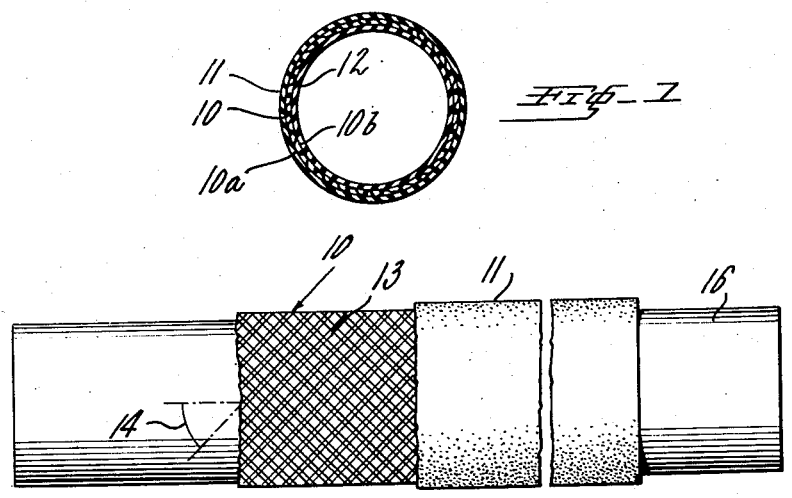
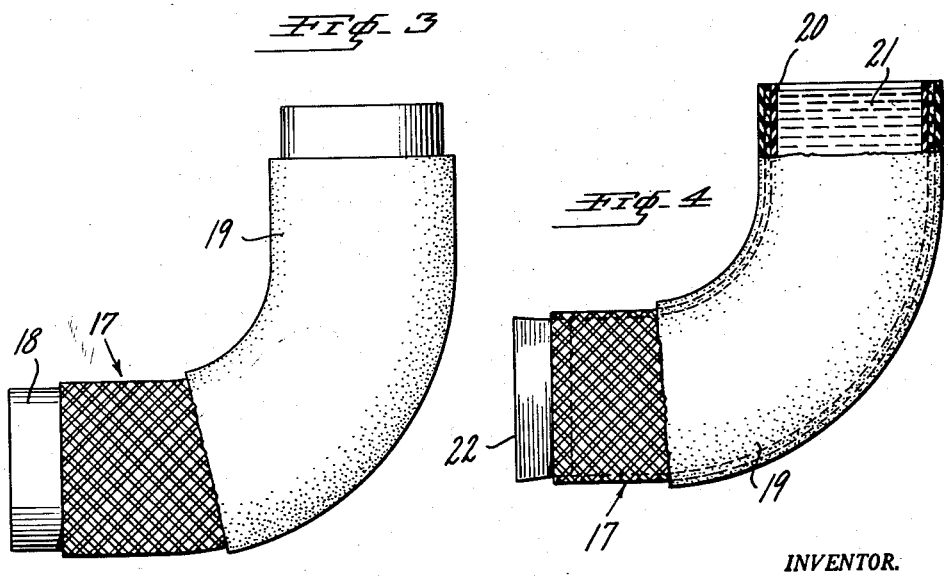
INVENTOR.
REYNOLD C. HERMAN
BY
ATTORNEY

United States Patent Office 2,906,638
Patented Sept. 29, 1959

2,906,638

METHOD OF COATING SEAMLESS BRAIDED GLASS FIBER TUBES

Reynold C. Herman, East Paterson, N.J., assignor to United States Rubber Company, New York, N.Y., a corporation of New Jersey Application July 9, 1954, Serial No. 442,397

4 Claims. (Cl. 117—7)

This invention relates to an improved method of making flexible, seamless, braided, fabric reinforced tubes having cured elastomeric coatings, such as natural or synthetic rubber.

Such tubes are useful for conducting fluids where lightweight constructions are required. The tubes are particularly useful as hot air ducts in airplanes where heat resistant materials in the tube are required. For that purpose staple or continuous glass filaments may be used for the braided reinforcing material and a synthetic rubber, such as silicone rubber, is preferred as an impervious coating material.

Heretofore, air ducts have been made of woven glass fabric which was impregnated with gum rubber which coated both sides. The fabric was then cut on the bias, and formed into the usual bias-cut strip by lap-seaming the gum coated bias edges of the fabric. The ducts were made by wrapping the bias-cut strips on a cylindrical metal mandrel into the form of a tube in which the longitudinal edges of the strip extended along the axis of the tube, and were lapped and adhered together with the gum coating thereon to form a longitudinal lapped seam. This prior method of manufacture and tube construction is hereinafter referred to as the lapped seam method or lapped seam construction.

In the practice of the present invention an uncoated seamless braided tube, which forms the reinforcing fabric is first mounted on a mandrel and coated with the elastomeric material on the mandrel, which results in an improved method of manufacture and construction. Such method and construction will hereinafter be referred to as the seamless tubular method or construction.

The advantages of the seamless tubular method over the lapped seam method are as follows:

In the seamless tubular method, the unimpregnated glass tube may be made in any length desired on an automatic braiding machine, and then cut to the length of the finished part, thus gaining the advantage of quantity production. A similar impregnated tube of the lapped seam construction would be limited in length by the standard width of the woven glass fabric sheets unless diagonal seams are used, but this would still not avoid the hand work of forming the longitudinal seam on a mandrel.

By the very nature of the method of making the seamless tubular construction, a surface of tacky rubber is never adjacent to the mandrel, thus eliminating the problem of rubber adhering to metal during the cure. In the lapped seam method, the mandrel must be treated or wrapped with some material which will prevent adhesion of the rubber to the metal during the cure.

The seamless tubular method is especially suited to the manufacture of axially curved or elbow ducts which are made in part on a form. The uncoated braided tube may be slipped right on the form and then coated with rubber, whereas with the lapped seam method, the bias-cut sheet material must be fitted smoothly around the form and joined with a seam or seams. In the practice of such prior method, the adhesion of the tacky precoated fabric to the metal form is still a problem.

The finished seamless tubular construction is uniform in appearance throughout and contains no laps or seams which are inherent in the lapped seam construction. The elimination of the lap also results in a tighter fit of the duct to the part to which it is assembled in service and greater structural strength.

The above and other advantages of the seamless tubular method or construction relating to this invention will be fully apparent from the following specification when read in connection with the accompanying drawing and will be pointed out with particularity in the appended claims.

In the drawing:

Fig. 1 is a cross-section of the completed seamless tubular construction;

Fig. 2 illustrates a seamless braided tube mounted over a straight cylindrical metal mandrel and having an impervious coating applied to one surface thereof;

Fig. 3 shows the braided seamless tube mounted over an elbow mandrel and having an impervious coating applied to one surface thereof; and Fig. 4 illustrates a method of applying an impervious coating to the other surface of the tube in Fig. 3.

Referring to Fig. 1, the seamless tubular construction comprises a circular, seamless braided glass tube 10, which is covered on each side and impregnated with impervious elastomeric coatings 11 and 12. The elastomer is applied as a liquid which is preferably either an aqueous dispersion of natural or synthetic rubber latex, or a dispersion of silicone rubber in any suitable organic liquid such as toluene, gasoline or xylene.

Referring to Fig. 2, the straight seamless tubular construction is manufactured by providing a straight, braided glass tube 10 having interwoven flexible strands 13 which make an angle 14 of 40 to 55° with the axis of the tube, so that the diameter of the braided tube 10 can be readily expanded and contracted diametrically. The tube is pushed over a metal mandrel 16 having a diameter substantially equal to the inner diameter of said tube. The tube is pushed rather than pulled onto the mandrel 16 so that the braid will be diametrically expanded rather than contracted in order to facilitate the operation of mounting the braid onto the mandrel. After the tube has been placed on the mandrel, it is stretched axially by pulling each end of the braid in opposite directions in order to cause the braid to contract diametrically onto the surface of the mandrel and hug it tightly. As will be apparent from Fig. 1, the tube presents an outer surface 10a, and an inner surface 10b, which latter surface is sometimes referred to hereinafter as the opposite surface. The surface 10a is then covered and impregnated with a coating of rubber 11, which may be sprayed, brushed or dipped onto the surface. This coating is then set in a conventional manner. The terms set or setting as used herein mean drying the liquid rubber until it becomes non-tacky with or without curing.

The next step is the removal of the tube 10 from the mandrel 16. This is accomplished by pushing the tube off the mandrel in the same manner that it was pushed over the mandrel during the aforementioned mounting step. The braided tube coated on one side is then turned inside out. This may be done by extending a rod smaller than the inside diameter of the tube into the end of the tube for one or two inches and taping this end to the rod. The tube is reversed by pushing the remainder of the tube backward over the taped portion and over the rod. Following this, the tube 10 is remounted over the mandrel, rubber coating 12 is applied to surface 10b, and set, all as noted above. The completed seamless tubular construction is then removed from the mandrel in the same manner as before.

An axially curved or elbow seamless tubular construction having the cross-section shown in Fig. 1 may be made as illustrated in Figs. 3 and 4. Referring to Fig. 3, a straight seamless tube 17, which is identical to the tube 10, is pushed over and stretched onto the axially curved or elbow mandrel 18 in the same manner as tube 10 is mounted on mandrel 16. It will be evident that the tube 17 presents an outer surface and an inner or opposite surface which correspond to surfaces 10a and 10b of the braided tube 10 in Fig. 1. A coating of rubber 19 is applied to the outer surface of tube 17, and set as described in reference to the coating 11 in Fig. 1.

The application of an impervious rubber coating to the inner or opposite surface of tube 17 is illustrated in Fig. 4. The first step comprises removing tube 17 from mandrel 18 by pushing to expand the braid diametrically and thus facilitate removal as noted above in reference to tube 10. One end of the elbow tube 17 is closed by means of a cork plug 22 and the tube is then filled by pouring liquid rubber 21 therein. After a sufficient amount of the rubber has been deposited or coagulated on the inner surface of the elbow tube 17 to form an impervious coating 20, the excess liquid rubber is poured out and the cork plug is removed. This coating is then set in a conventional manner to form the completed elbow seamless tubular construction.

It will be apparent to one skilled in the art that the surface 10b of the straight tube 10 shown in Fig. 2, may be coated by filling the tube with the liquid elastomer as shown in Fig. 4. However, in order to speed production and eliminate the pouring operation, it is preferable to turn tube 10 inside out and coat surface 10b on mandrel 16. It will also be evident that axially curved tube 17 may be turned inside out and that the inner or opposite surface may be coated on mandrel 18. Nevertheless, it is preferred that this step be performed as shown in Fig. 4 to avoid any distortion in the shape of tube 17, particularly when tubes with a small axial radius of curvature are used.

The foregoing description applies to the use of liquid rubbers which may be set, that is, dried to a non-tacky condition with or without curing. If an aqueous dispersion of the usual vulcanizable latex is employed both the inner and outer coatings may be cured at the same time as the last step in the process. If the latex is of the pre-cured or self-curing type, then curing of the coatings will automatically occur during or shortly after drying. It is obvious that the rate of cure may be varied as desired in either case. Furthermore, it is a characteristic of latex that it becomes non-tacky merely upon drying and therefore no problem of the rubber adhering to the metal mandrel will occur.

On the other hand, if a dispersion of silicone rubber in any suitable organic liquid is employed, it will be necessary to at least partially cure the first coating before applying the second coating to the opposite surface of the tube. This procedure is followed so that the first coating will be rendered non-tacky for ease of handling and to prevent undesirable sticking to the mandrel. The second coating will then be cured as the final step in the method.

While certain specific features of the embodiments of the invention herein illustrated have been described and definite steps in its mode of manufacture have been referred to, it is to be understood that various modifications in the structure and its method of production may be made by those skilled in the art without departing from the invention as defined in the appended claims.

Having thus described my invention, what I claim and desire to protect by Letters Patent is:

1. In the manufacture of flexible, seamless tubes having cured elastomeric coatings, the method which comprises pushing a braided glass fiber tube over a mandrel, stretching said tube longitudinally on said mandrel to cause the individual fibers to hug said mandrel tightly, applying a first coating of liquid elastomer to the outer surface of said tube, setting said first coating, pushing said tube from said mandrel, applying a second coating of liquid elastomer to the opposite surface of said tube, and setting said second coating.

2. In the manufacture of flexible, seamless tubes having cured rubber coatings, the method which comprises pushing a braided glass fiber tube over a mandrel, stretching said tube axially on said mandrel to cause the individual fibers to hug said mandrel tightly, applying a first coating of liquid rubber to the outer surface of said tube, setting said first coating, pushing said tube off said mandrel, turning said tube inside out, pushing said tube over said mandrel with said first set coating contacting the latter, stretching said tube axially on said mandrel to cause the individual fibers to hub said mandrel tightly, applying a second coating of liquid rubber to the uncoated, now outer surface of said tube, and setting said second coating.

3. In the manufacture of flexible, seamless tubes having cured elastomeric coatings, the method which comprises pushing a braided glass fiber tube over a mandrel, applying a tensile force to said tube longitudinally thereof to contact the same diametrically on said mandrel and to cause the individual fibers to closely embrace said mandrel, applying a first coating of liquid elastomer to the outer surface of said tube while the same is in stretched condition on said mandrel, setting said first coating, applying a compressive force to said tube longitudinally thereof to expand the same diametrically on said mandrel and to release said fibers from the latter, pushing said tube from said mandrel, filling said tube with liquid elastomer to thereby apply a second coating to the inner surface of said tube, pouring out the excess elastomer after said second coating is formed on said inner surface, and setting said second coating.

4. In the manufacture of flexible, seamless tubes having cured rubber coatings, the method which comprises pushing a braided glass fiber tube over an elbow-shaped mandrel, stretching said tube longitudinally on said mandrel to cause the individual fibers to hug said mandrel tightly, applying a first coating of liquid rubber to the outer surface of said tube, setting said first coating, pushing said tube off said mandrel while maintaining said tube in elbow-shaped condition, plugging up one end of said elbow-shaped tube, filling said elbow-shaped tube with liquid rubber to apply a second coating to the inner surface of said elbow-shaped tube, pouring out the excess rubber after said second coating is formed on said inner surface, unplugging said one end of said elbow-shaped tube, and setting said second coating.

References Cited in the file of this patent

UNITED STATES PATENTS

| | | |
|---|---|---|
| Re. 969 | Hinckley | June 5, 1860 |
| 459,509 | Johns | Sept. 15, 1891 |
| 1,831,333 | Watkins | Nov. 10, 1931 |
| 2,034,352 | Pearce | Mar. 17, 1936 |
| 2,049,251 | Deitsch | July 28, 1936 |
| 2,153,441 | Tillotson | Apr. 4, 1939 |
| 2,588,571 | Porter | Mar. 11, 1952 |
| 2,730,462 | Ewing | Jan. 10, 1956 |

FOREIGN PATENTS

| | | |
|---|---|---|
| 553,669 | Great Britain | June 1, 1943 |